United States Patent [19]

Uebele et al.

[11] Patent Number: 4,692,502

[45] Date of Patent: Sep. 8, 1987

[54] POLYMERIZATION PROCESS FOR CARBOXYL CONTAINING POLYMERS UTILIZING OIL SOLUBLE IONIC SURFACE ACTIVE AGENTS

[75] Inventors: Curtis E. Uebele, Bedford; Lawrence E. Ball, Akron; Richard J. Jorkasky, II, Maple Heights; Eddie Wardlow, Jr., Cleveland, all of Ohio

[73] Assignee: The Standard Oil Company, Cleveland, Ohio

[21] Appl. No.: 872,065

[22] Filed: Jun. 9, 1986

[51] Int. Cl.$^4$ .......................... C08F 2/08; C08F 2/26; C08F 2/28

[52] U.S. Cl. .................................. 526/193; 526/209; 526/220; 526/225; 526/236; 526/317.1; 526/318.2; 526/318.3; 526/318.5

[58] Field of Search ............... 526/209, 220, 193, 225, 526/236, 317.1, 318.2, 318.3, 318.5

[56] References Cited

U.S. PATENT DOCUMENTS

| | | | |
|---|---|---|---|
| 2,980,655 | 4/1961 | Glass et al. | 526/209 |
| 3,875,009 | 4/1975 | Kurth et al. | 260/29.6 TA |
| 3,919,156 | 11/1975 | Khanna et al. | 260/29.6 TA |
| 3,948,867 | 4/1976 | Bader et al. | 260/80 M |
| 3,957,739 | 5/1976 | Cabestany et al. | 526/207 |
| 3,963,688 | 6/1976 | Lorenz et al. | 526/236 |
| 4,092,287 | 5/1978 | Ito et al. | 260/29.6 RB |
| 4,328,149 | 5/1982 | Morse et al. | 524/458 |
| 4,358,403 | 11/1982 | Distler et al. | 524/745 |
| 4,375,533 | 3/1983 | Park et al. | 526/193 |
| 4,419,502 | 12/1983 | Sehm | 526/209 |
| 4,420,596 | 12/1983 | Lockhead et al. | 526/212 |
| 4,526,937 | 7/1985 | Hsu | 524/724 |

OTHER PUBLICATIONS

"Surfactants and Detersive Systems" Kirk–Othmer Encyclopedia of Chemical Technology, vol. 22, 3rd Ed., 332–432, (J. Wiley & Sons, Inc., 1893).

*Primary Examiner*—Paul R. Michl
*Assistant Examiner*—Alex H. Walker
*Attorney, Agent, or Firm*—David P. Yusko; John E. Miller; Larry W. Evans

[57] ABSTRACT

Olefinically unsaturated carboxylic acid monomers containing at least one activated carbon to carbon olefinic double bond and at least one carboxyl group, such as acrylic acid, are polymerized in an organic media in the presence of free radical forming catalysts and at least one oil soluble ionic surface active agent selected from the group consisting of:

(a) anionic surface active agents of the formula:

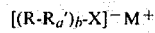

(b) cationic surface active agents of the formula:

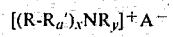

and (c) amphoteric surface active agents of the formula:

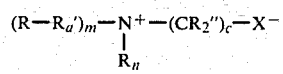

wherein
R is a hydrophobic moiety having eight or more carbons,
R' is a hydrophilic moiety,
R" is each independently hydrogen, an alkyl group, an aryl group or an alkyl/aryl group,
X$^-$ is a carboxylate, sulfonate, sulfate or phosphate group,
M$^+$ is a water soluble cation,
A$^-$ is a water soluble anion,
a is 0, 1, 2, 3, 4, 5, 6, 7 or 8,
b is 0, 1, 2 or 3,
c is 1, 2, 3, 4, 5, 6, 7 or 8,
x and y are each 0, 1, 2, 3 or 4 with the proviso that $x+y=4$, and
m and n are each 0, 1, 2 or 3, with the proviso that $m+n=3$.

20 Claims, No Drawings

POLYMERIZATION PROCESS FOR CARBOXYL CONTAINING POLYMERS UTILIZING OIL SOLUBLE IONIC SURFACE ACTIVE AGENTS

BACKGROUND OF THE INVENTION

Carboxyl containing polymers of vinyl or vinylidene monomers containing at least one terminal $CH_2=C<$ group are well known. Such polymers may be homopolymers, or copolymers with other vinyl or vinylidene monomers and unsaturated polymerizable carboxylic acids such as acrylic acid, methacrylic acid, maleic acid, itaconic acid and the like. Often copolymers of these acids are cross-linked with small amounts of cross-linking agents. These materials are normally prepared by polymerization with a free radical catalyst in an organic medium in a closed vessel or autoclave equipped with stirring. During the course of such polymerizations, polymer begins to precipitate from the solution as it is formed and flocculates and forms aggregates. This aggregation is generally uncontrolled and interferes with the polymerization reaction by retarding access of monomer to free radicals and contributing to poor removal of the heat produced by the polymerization. As a consequence, it is difficult to obtain uniform polymerizations because of the variation in temperature and the aggregation of polymers. This effect often becomes worse when there is local variation in temperature in different reactor regions. Consequently, variation of product quality from lot to lot is obtained. Further, the precipitated polymer forms a slurry in the solvent which becomes extremely thick; this results in ineffective mixing, and generally causes extensive fouling on reactor surfaces. A further problemm is that solvent and monomers are trapped in the polymers during aggregation and removal of such trapped solvent is time consuming, decreases production rates and makes it difficult to obtain dried carboxyl containing products having less than 500 ppm of residual media in the polymer product.

U.S. Pat. No. 4,375,533 to Park et al. disclosed a process for overcoming some of the above problems. The Park et al. process for the polymerization of acrylic acid and optional comonomers in an organic media is characterized by the use of nonionic surface active agents having HLB values between 1 and about 10.

Similarly, U.S. Pat. No. 4,419,502 to Sehm, disclosed a process for the polymerization of acrylic acid and optional comonomers in the presence of a nonionic surface active agent selected from polyoxyethylene alkyl ethers and polyoxyethylene sorbitol esters and having an HLB value greater than 12 l and U.S. Pat. No. 4,420,596 to Lochhead et al. disclosed a process for polymerizing carboxylic acids in mineral spirits. This process also employed nonionic surface active agents having HLB values less than 10.

Lastly, U.S. Pat. No. 4,526,937 to Hsu teaches the polymerization of acrylic acid in an organic solvent with a free radical catalyst. This process incorporates nonionic block copolymers of propylene oxide and ethylene oxide to minimize undesirable flocculation and agglomeration.

An object of the instant invention is to develop an improved process for the polymerization of acrylic acid and various comonomers by employing oil soluble ionic surface active agents in the polymerization process. It is an object of the instant invention to reduce build up and obtain more satisfactory particle sizes for the precipitated polymer, which will result in better heat transfer and higher total solids produced.

SUMMARY OF THE INVENTION

The invention is a method for polymerizing olefinically unsaturated carboxylic acids containing at least one activated carbon to carbon olefinic double bond and at least one carboxyl group. These monomers are polymerized in an organic media having some solubilizing effect on one or more of the monomeric ingredients, oil soluble but substantially none on the resulting polymer. The polymerization is conducted in the presence of free radical forming catalysts and at least one oil soluble ionic surface active agent selected from the group consisting of:

(a) anionic surface active agents of the formula:

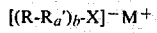
$[(R-R_a')_b-X]^- M^+$ (b) cationic surface active agents of the formula:

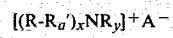
$[(R-R_a')_x NR_y]^+ A^-$ and (c) amphoteric surface active agents of the formula:

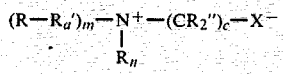
$$(R-R_a')_m-\underset{\underset{R_n}{|}}{N^+}-(CR_2'')_c-X^-$$

wherein
R is a hydrophobic moiety having eight or more carbons,
R' is a hydrophilic moiety,
R'' is each independently hydrogen, an alkyl group, an aryl group or an alkyl/aryl group,
$X^-$ is a carboxylate, sulfonate, sulfate or phosphate group,
$M^+$ is a water soluble cation,
$A^-$ is a water soluble anion,
a is 0, 1, 2, 3, 4, 5, 6, 7 or 8,
b is 1, 2, or 3,
c is 1, 2, 3, 4, 5, 6, 7 or 8,
x and y are each 0, 1, 2, 3 or 4 with the proviso that x+y=4, and
m and n are each 0, 1, 2, 3, with the proviso that m+n=3.

The use of oil soluble ionic surfactants in the polymerization of olefinically unsaturated acids yields reduced polymer build-up in the reactor and provides a more desirable particle size for the precipitated polymer. These effects result in better transfer from the system during polymerization and in the production of higher total solids. Further, the oil soluble surfactants provide a reaction product having good fluidity whih can be easily removed from the polymerization vessel by conventional means.

DETAILED DESCRIPTION

The Monomers

The carboxyl containing polymers are prepared from vinylidene monomers containing at least one terminal $CH_2=C<$ group. These monomers may be homopolymerized or copolymerized with unsaturated, polymerizable carboxylic monomers such as acrylic acid, maleic acid, itaconic acid and the like. In addition these polymers or copolymers may include small amounts of crosslinking monomers. The carboxyl containing polymers have molecular weights greater than about 500 to several million, usually greater than about 10,000 to about 900,000 or more.

The carboxylic monomers useful in the production of the polymers of this invention are the olefinically-unsaturated carboxylic acids containing at least one activated carbon-to-carbon olefinic double bond, and at least one carboxyl group; that is, an acid containing an olefinic double bond which readily functions in polymerization because of its presence in the monomer molecule, either in the alpha-beta position with respect to a carboxyl —C=C—COOH group; or as a part of a terminal methylene (CH$_2$=C<) grouping. Olefinically-unsaturated acids of this class include such materials as the acrylic acids typified by the acrylic acid itself, methacrylic acid, ethacrylic acid, alpha-chloro-acrylic acid, alpha-cyano acrylic acid, beta methyl-acrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxyl-4-phenyl butadiene-1,3), itaconic acid, citraconic acid, mesaconic acid, glutaconic acid, aconitic acid, maleic acid, fumaric acid, and tricarboxyl ethylene. As used herein, the term "carboxylic acid" includes the polycarboxylic acids and those acid anhydrides, such as maleic anhydride, wherein the anhydride group is formed by the elimination of one molecule of water from two carboxyl groups located on the same polycarboxylic acid molecule. Maleic anhydride and other acid anhydrides useful herein have the general structure:

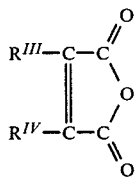

wherein $R^{III}$ and $R^{IV}$ are each independently selected from the group consisting of hydrogens; halogens; a cyano (—C≡N) group; and alkyl, aryl, alkyl/aryl and cycloalkyl groups, such as methyl, ethyl, propyl, octyl, decyl, phenyl, tolyl, xylyl, benzyl, cyclohexyl, and the like. As used herein and throughout this description, "alkyl/aryl" refers to organic groups having an aliphatic portion in conjunction with an aromatic portion.

The preferred carboxylic monomers for use in this invention are the monoolefinic acrylic acids having the general structure.

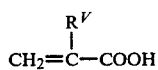

wherein $R^V$ is a substituent selected from the class consisting of hydrogen, a halogen, a cyano (—C≡N) group, monovalent alkyl groups, monovalent aryl groups, monovalent alkyl/aryl groups, and monovalent cycloaliphatic groups. Of this class, acrylic and methacrylic acid are most preferred because of generally lower cost, ready availability and ability to form superior polymers.

The polymes contemplated include both homopolymeric carboxylic acids or anhydrides thereof, or the defined carboxylic acids copolymerized with one or more other vinyl or vinylidene monomers containing at least one terminal CH$_2$=C< group. Such materials include, for example, acrylic ester monomers including those acrylic ester monomers having long chain aliphatic groups such as derivatives of an acrylic acid represented by the formula.

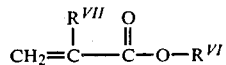

wherein $R^{VI}$ is an alkyl, aryl, or alkyl/aryl group having from 10 to 30 carbon atoms, preferably 10 to 20 carbon atoms and $R^{VII}$ is hydrogen or a methyl or ethyl group, present in the copolymer in amount, for example, from about 1 to 30 weight percent, and for some uses more preferably, about 5 to 15 weight percent. Representative higher alkyl acrylic esters are decyl acrylate, isodecyl methacrylate, lauryl acrylate, stearyl acrylate, behenyl acrylate and melissyl acrylate and the corresponding methacrylates. Mixtures of two or three or more long chain acrylic esters may be successfully polymerized with one of the carboxylic monomers. One useful class of copolymers are those methacrylates where the alkyl group contains 16 to 21 carbon atoms.

Other acrylic esters contemplated are also derivatives of an acrylic acid used in amounts, for example, up to about 30 weight percent represented by the formula

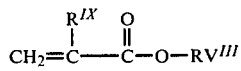

wherein $R^{VIII}$ is an alkyl, alkoxy, haloalkyl, cyanoalkyl, and like groups having from 1 to 9 carbon atoms and $R^{IX}$ is hydrogen or a methyl or ethyl group. These acrylic esters are present in the copolymer for some uses in amounts up to 30 weight percent and more preferably from about 5 to 25 weight percent. Representatives acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl acrylate, nonyl acrylate, hexyl acrylate, n-hexyl methacrylate, and the like. Mixtures of these two classes of acrylates provide useful copolymers.

Other vinyl or vinylidene monomers, such as the α,β-olefinically unsaturated nitriles may also be used, particularly in conjunction with acrylic esters. The α,β-olefinically unsaturated nitriles useful in the interpolymers embodied herein are preferably the monoolefinically unsaturated nitriles having from 3 to 10 carbon atoms such as acrylonitrile, methacrylonitrile, ethacrylonitrile, chhloroacrylonitrile, and the like. Most preferred are acrylonitrile and methacrylonitrile. The amounts used, for example, for some polymers are up to about 30 weight percent of the total monomers copolymerized.

Acrylic amides include monoolefinically unsaturated amides that may be incorporated in the interpolymers of this invention having at least one hydrogen on the amide nitrogen and olefinic unsaturation is alphabeta to the carbonyl group. Representative amides include acrylamide, methacrylamide, N-methyl acrylamide, N-t-butyl acrylamide, N-cyclohexyl acrylamide, N-ethyl acrylamide and others. Very much preferred are acrylamide and methacrylamide used in amounts, for example, from about 1 to 30 weight percent of the total monomers copolymerized. Representative of other acrylic amides are N-alkylol amides of alpha, beta-olefinically unsaturated carboxylic acids including those having from 4 to 10 carbon atoms such as N-methylol acrylamide, N-ethanol acrylamide, N-propanol acrylamide, N-methylol methacrylamide, N-ethanol methacrylamide, N-methylol maleamide, N-methylol maleamic acid, N-methylol maleamic acid esters, the N-alkylol amines of the vinyl aromatic acids such as N-methylol-p-vinyl benzamide, and the like. The preferred monomers of the N-alkylol amide type are the N-alkylol amides of alpha, beta-monoolefinically unsaturated monocarboxylic acids and the most preferred are N-methylol acrylamide and N-methylol methacrylamide used in amounts for example of about 1 to 20 weight percent. N-alkoxymethyl acrylamides also may be used. It is thus intended that where references are made herein regarding the essential N-substituted alkoxymethyl amides, the term "acrylamide" includes "methacrylamide" within its meaning. The preferred alkoxymethyl acrylamides are those with an alkyl group containing from 2 to 5 carbon atoms, for example N-butoxymethyl acrylamide.

Other vinyl or vinylidene comonomers generally include in addition to those described above, at least one other olefinically unsaturated monomer, more preferably at least one other vinyl or vinylidene monomer copolymerized therewith, for example up to about 30% or more by weight of the total monomers. Suitable monomers include α-olefins containing from 2 to 12 carbon atoms, more preferably from 2 to 8 carbon atoms; dienes containing from 4 to 10 carbon atoms including butadiene; vinyl esters and allyl esters such as vinyl acetate, vinyl aromatics such as styrene; vinyl and allyl ethers and ketones such as vinyl methyl ether and methyl vinyl ketone; cyanoalkyl acrylates such as methyl α-cyano acrylate, the propyl α-, β- and α-cyano acrylates, vinyl halides and vinyl chloride, vinylidene chloride and the like; esters of maleic and fumaric acid and the like.

Optionally, the polymers may be cross-linked with any polyfunctional vinyl or vinylidene monomer containing at least 2 terminal $CH_2=C<$ groups, including for example, butadiene, isoprene, divinyl benzene, divinyl naphthalene, allyl acrylates and the like. Particularly useful cross-linking monomers are polyalkenyl polyethers having more than one alkenyl ether grouping per molecule. The most useful crosslinkers possess alkenyl groups in which an olefinic double bond is attached to a terminal methylene $CH_2=<$ groups. These are made by the etherification of a polyhydric alcohol containing at least 4 carbon atoms and at least 3 hydroxyl groups. Compounds of this class may be produced by reacting an alkenyl halide, such as allyl chloride or allyl bromide with a strongly alkaline aqueous solution of one or more polyhydric alcohols. The product is a complex mixture of polyethers with varying numbers of ether groups. Analysis reveals the average number of ether groupings on each molecule. Efficiency of the polyether cross-linking agent increases with the number of pottentially polymerizable groups on the molecule. It is preferred to utilize polyethers containing an average of two or more alkenyl ether groupings per molecule. Representative of other cross-linking monomers are diallyl esters, diallyl ethers, allyl acrylates, methacrylates and acrylamides, and methacrylamides, tetraallyl tin, tetravinyl silane, polyalkenyl methanes, diacrylates, and dimethacrylates, divinyl compounds such as divinyl benzene, polyallyl phosphate, diallyloxy compounds, diallyloxy phosphite esters and the like. Typical agents are triallyl pentaerythritol, trimethylolpropane triacrylate, 1,6-hexanediol diacrylate, trimethylol-propane diallyl ether, pentaerythritol triacrylate, tetramethylene dimethacrylate, tetramethylene diacrylate, ethylene diacrylate, ethylene dimethacrylate, triethylene glycol dimethacrylate, and the like.

When the optional cross-linking agent is present, the polymeric mixtures usually contain up to about 5% by weight of cross-linking monomer based on the amount of the carboxylic acid monomer and other monomers, if present. More preferably the mixture contains about 0.1 to 2.0 weight percent of crosslinker.

The Organic Media

The polymerizations are normally conducted in an organic media having some solubilizing effect on one or more of the monomeric ingredients, but substantially none of the resulting polymers. In other words, the medium used for the polymerization is one in which the monomers are preferably soluble and the polymer is substantially insoluble. Such materials are normally organic liquids which are solvents for the monomers, but nonsolvents for the polymers, or a mixture of such solvent so that the polymer product is preferably obtained as a very fine friable or fluffy precipitate.

Typical solvents include hydrocarbon containing 6 to 40 carbon atoms, benzene, xylene, tetralin, hexane, heptane, cyclohexane, mineral spirits and mineral oils; halocarbons such as carbon tetrachloride, chloroform, trichloroethylene, methyl chloride, ethyl chloride and methylene chloride; chlorofluoroalkanes such as chlorofluoromethane and chlorofluoroethane containing at least four halogen atoms; esters such as methyl acetate, ethyl acetate and butyl propionate; ketones such as methylethylketone, acetone, and dioxane.

The amount of organic medium used normally will be in excess of the monomers to be polymerized and the proportion may vary from at least 1 weight percent of monomers and 99 weight percent organic medium up to about 75 weight percent monomers and 25 weight percent organic medium, more normally a concentration of about 10 to 50 weight percent monomers is employed. Excellent results have been obtained with mineral spirits having a flash point greater at 120° F. containing 0 to 2% aromatics; 40 to 85% paraffins and 15 to 50% naphthenes.

The Surface Active Agent

The hallmark of the instant polymerization process is the use of oil soluble ionic surface active agents or surfactants. As used herein "oil soluble" means that the surfactant when combined with the organic media will produce a single phase optically clear mixture at concentrations of surfactant in the organic media of 0.1 percent or more at temperatures employed during polymerization. More preferable oil soluble ionic surface active agents produce a single phase, optically clear mixture at concentrations of 0.5 percent or more of surfactant in the organic media.

The ionic surface active agents are classified as anionic, cationic and amphoteric surface active agents. The most fundamental characteristic of surfactants is the presence of two structurally dissimilar groups; in the instant surfactants these are a hydrophobic (i.e. water-hating) moiety and a hydrophilic (i.e. water-liking) moiety. The anionic, cationic and amphoteric surface active agents are distinguished by their solubilizing groups for polar solvents (normally water). Anionic solubilizing groups are carboxylates, sulfonates, sulfates, phosphates and phosphinates. Cationic solubilizing groups are primary, secondary and tertiary amines and quaternary ammonium groups. Amphoteric surfactants are identified by some combination of the anionic and cationic solubilizing moieties.

The ionic surfactants of use in the instant process are
(i) oil soluble anionic surfactants of the formula:

$$[(R-R_a')_b-X]^- M^+$$

(ii) oil soluble cationic surfactants of the formula:

$$[(R-R_a')_x NR_y]^+ A^-$$

and
(iii) oil soluble amphoteric surfactants of the formula:

$$(R-R_a')_m-\underset{R_n}{\overset{|}{N^+}}-(CR_2'')_c-X^-$$

wherein
R is a hydrophobic moiety having eight or more carbons,
R' is a hydroxyphilic moiety,
R" is each independently hydrogen, an alkyl group, an aryl group or an alkyl/aryl group,
X— is a carboxylate, sulfonate, sulfate or phosphate group,
M+ is a water soluble cation,
A− is a water soluble anion,
a is 0, 1, 2, 3, 4, 5, 6, 7 or 8,
b is 1, 2 or 3,
c is 1, 2, 3, 4, 5, 6, 7 or 8,
x and y are each 0, 1, 2, 3 or 4 with the proviso that x+y=4, and
m and n are each 0, 1, 2 or 3, with the proviso that m+n=3.

As used herein, "moiety" refers to a portion of the surface active agent. The hydrophobic and hydrophilic moieties, designated by R and R' respectively are univalent or divalent organic radicals as needed to fullfill the bonding requirements of the surface active agent.

Suitable hydrophobic moieties designated by R in the above formulas are alkyl groups, aryl groups, alkyl/aryl groups, as well as halogenated and substituted alkyl, aryl or alkyl/aryl groups. These moieties are further characterized as containing 8 or more carbon atoms. Preferably, R is a $C_9$ to $C_{21}$ hydrocarbon.

Suitable hydrophilic moieties designated by R' in the above formulas fall within the following generic classes: (1) polyoxyethylenes; (2) polyoxyethylene alcohols; (3) polyoxyethylene esters; (4) polyoxyethylene alkylamines; (5) amides, such as acrylamides, methacrylamide, polyacrylamide and polymethacrylamide, (6) polyols including glycerol, sorbitol, polyglycerol and polysorbitol, and (7) polyalkylene oxide block copolymers.

In the above formulas M+ may be H+ or any monovalent or multivalent metal or ammonium cation. Representative cations designated by M+ are $Na^+$, $K^+$, $Mg^{+2}$, $Ca^{+2}$, $Sr^{+2}$, $Ba^{+2}$, $Fe^{+3}$, $Al^{+3}$, $NH_4^+$, and mono-, di- and tri-ethanolammonium.

Similarly, in the above formulas A− may be any monovalent or multivalent anion. Suitable anions designated by A− are $OH^-$, $F^-$, $Cl^-$, $Br^-$, $I^+$, $NO_3^-$, $SO_4^{-2}$, $SO_3^{-2}$ and $PO_4^{-3}$.

Representative anionic surface active agents include carboxylates of the general structure RCOO-M+ where R and M+ are as previously defined; polyalkoxycarboxylates such as a sodium alkylphenol $(EtO)_8$ carboxylate; acrylated protein hydrolysates prepared by the acylation of protein hydroysates with fatty acids or acid chlorides; sulfonates, especially alkyl/aryl sulfonates such as Atlas G-3300 produced by ICI Americas Inc.; alkylbenzenesulfonates such as sodium dodecyl benzene sulfonate, triethanolamine dodecyl benzene sulfonate, or ammonium dodecyl benzene sulfonate; alkylarylsulfonates, such as the sodium and ammonium salts of toluene-, xylene-, and isopropyl-benzenesulfonic acid; lignosulfonates, such as the sugar free sodium based sulfonates of lignin such as Polyfon F, Polfon H, Polyfon O and Polyfon T produced by Westvaco Chemicals Division; naphthalenesulfonates, such as sodium isopropyl naphthalenesulfonate; α-olefinsulfonates, such as the sodium alpha-olefin $C_{14}-C_{16}$ sulfonates; dialkyl sulfosuccinates, such as the dihexyl-, the dioxtyl- and ditridecyl-sodium sulfosuccinates produced by Mona Industries; amidosulfonates, such as sodium N-oleoyl-N-methyltaurte or sodium N-methyl-N-tall oil-acid taurate; sulfoethyl esters of fatty acids which include ring sulfonated alkyl phenol ethoxylates and disulfonated alkyldiphenyl oxide; sulfates of the formula $ROSO_3M^+$ where R and M+ are as previously defined; ethoxylated and sulfated alcohols of the formula $R-(OCH_2CH_2)_z OSO_3M^+$ where R and M+ are as previously defined and z is an integer greater than or equal to 0, such as sodium tridecyl sulfate; ethoxylated and sulfated alkylphenols of the formula $RC_6H_4(OC_2H_4)_z OSO_3M$ where R, M+, and z are as previously defined; sulfated acids, such as the sulfates or mono- and di-ethanolamines of fatty acids in the $C_{12}-C_{15}$ range; sulfated esters, such as those represented by the formula $CH_3(CH_2)_8CH[(OSO_3)Na](CH_2)_6CO_2R$ where R is methyl, ethyl, propyl, butyl or amyl; sulfated oils and fats, such as sulfated oleic acid sold under the name Actrosol SR75 and produced by Southland Corp.; and phosphate esters, such as the salts of mono and diesters of orthophosphoric acid.

Representative cationic surfactants include oxygen free amines selected from the group consisting of aliphatic mono-, di- and polyamines derived from fatty and rosein acids, such as an N-alkyltrimethylene diamine where the alkyl group is derived from coconut, tallow or soybean oil; oxygen containing amines selected from the group consisting of amine oxides, ethoxylated alkylamines, 1-(2-hydroxyethyl)-2-imidazolines, and alkoxylates of ethylenediamine, such as Monazoline O or Monazaline T produced by Mona Industries, Inc. which are a substituted imadazoline of oleic acid and tall oil respectively; tall oil fatty acid diethylenediamine and polyalkylene polyamine condensates; and quaternary ammonium salts such as the dialkyldimethylammonium salts, alkylbenzyldimethylammonium chlorides, alkyltrimethyl ammonium salts and alkylpyridinium halides.

Representative amphoteric sulfactants include imidazolinium derivatives prepared 2-alkyl-1-(2-hydroxyethyl)-2-imidazolines and from sodium chloroacetate; alkylbetaines and amidoalkylbetaines prepared from alkyldimethylamines and sodium chloracetate.

The above compounds have a multiplicity of functional groups and accordingly, a very large number of modifications is possible. Mixtures of said compounds can also be used. The amount of surfactant employed may be as low as 0.01 weight percent and as high as 40.0 weight percent, based on the weight of monomer or monomers to be polymerized. Usually the amount of surfactant employed will be in the range of about 0.5% to about 20% by weight. Preferably, an amount of surfactant in the range of 1.0 to 10.0 by weight is employed.

Process Parameters

Polymerization of the monomers in the organic medium is usually carried out in the presence of a free radical catalyst in a closed vessel in an inert atmosphere under autogenous pressure or artificially-induced pressure, or in an open vessel under reflux at atmospheric pressure. Temperature of the polymerization may be varied from about 0° to 100° C. or lower or higher, depending to a degree on the molecular weight desired in the polymer. Polymerization at 25° to 90° C. under autogenous pressure using a free radical catalyst is generally effective in producing polymer yields of 75% to 100%. Preferably the polymerization temperature is between 40° and 80° C.

Polymerization of the monomers is carried out in the presence of a free radical catalyst. Typical free radical forming catalysts include peroxygen compounds such as sodium, potassium and ammonium persulfates, caprylyl peroxide, benzoyl peroxide, hydrogen peroxide, pelargonyl peroxide, cumene hydroperoxides, tertiary butyl diperphthalate, tertiary butyl perbenzoate, sodium peracetate, sodium percabonate, and the like, as well as azo catalysts and azobisisobutyryl nitrile, hereinafter referred to as azoisobutyronitrile. Other catalysts utilizable are the so-called "redox" type of catalyst and the heavy-metal activated catalyst systems. Ultra-violet light and high energy radiation may also be used as a source of free radicals.

In the practice of the invention, the polymerization reactors may be either batch, semi-batch or continuous. The agitation may be any agitation sufficient to maintain the slurry and obtain effective heat transfer including, for example, helical agitators, pitched turbines and the like. The monomer may be batch charged or continuously added during the course of polymerization or by any other manner of polymerization techniques conventionally used. Where monomer is continuously added during the course of polymerization, typically up to 40 wt percent of the monomer is initially present in the reactor with the remaining monomer added during the course of polymerization. Normally polymerization time is from about 2 to 12 hours.

SPECIFIC EMBODIMENTS

In order to better illustrate the instant invention the following examples are provided:

EXAMPLE 1

Ionic Emulsifier

Into an 8 oz. polymerization bottle were charged: 546 parts of mineral spirits (Isopar M, Exxon), 99 weight parts acrylic acid, 1 weight part trimethylolpropane diallyl ether (TAMPDAE), 20 weight parts of Witconate TM P10-59 (an oil soluble isopropyl amine salt of dodecyl benzene sulfonic acid anionic emulsifier produced by Witco Chemical Corp.) and 0.2 weight parts of Vazo 64 (azobisisobutyronitrile—AIBN). The charge factor was 0.18 gms/part. The bottle was purged with a stream of nitrogen gas, sealed and tumbled at 60 C. for 16 hours. The result was a fluid, easily poured slurry of poly(acrylic acid-co-TMPDAE) in mineral spirits. Polymer conversion was 95%.

Aqueous solutions of the polymer were made directly from the slurry. The required amount of slurry (for the desired polymer level) was rapidly stirred with water containing sufficient $NH_4OH$ to neutralize the added polymer. The final pH of the solution was 9. Viscosities of the aqueous solutions were determined by means of a Brookfield Viscometer.

| Polymer Concentration (wt %) | 1% | 0.5% |
| --- | --- | --- |
| Viscosity (cps) | 33000 | 5400 |

EXAMPLE 2

Anionic Emulsifiers

Into an 8 oz. polymerization bottle were charged: 546 weight parts of mineral spirits (Isopar M, Exxon), 99 weight parts of acrylic acid, 1 weight parts of trimethylol diallyl ether (TMPDAE), 0.2 weight parts of azobisisobutyronitrile (Vazo 64, AIBN) and 20 weight parts of the anionic emulsifiers shown below. The polymerization was conducted as in Example 1 (above).

| Exp # | Emulsifier | Chemical Description | Oil Soluble | Results |
| --- | --- | --- | --- | --- |
| 2.1 | Aerosol OT (American Cyanamid) | Dioctyl ester of sodium sulfosuccinic acid | Yes | Very Fluid |
| 2.2 | Aerosol TR-AM (American Cyanamid) | Bis(tridecyl)ester of sodium sulfosuccinic acid | Yes | Very Fluid |
| 2.3 | Emphos PS-121 (Witco Chemical Corp.) | Phosphate ester | Yes | Very Fluid |
| 2.4 | Monawet MT-70E (Mona Industries) | Dioetyl sodium sulfosuccinate | Yes | Very Fluid |
| 2.5 | Ninate 401 (Stepan Chemical Co.) | Calcium alkylaryl sulfonate | Yes | Very Fluid |
| 2.6 | Sandopan JH-6 (Sandoz Chemicals Corp.) | Ethoxylated anionic complex | Yes | Very Fluid |
| 2.7 | Sandopan LA-6 (Sandoz Chemicals Corp.) | Ethoxylated anionic complex | Yes | Very Fluid |
| 2.A | Witconate TM 1075X (Witco Chemical Corp.) | No | Solid Mass, no liquid | |
| 2.B | Aerosol 18 | Disodium | No | Lumps stuck |

| Exp # | Emulsifier | Chemical Description | Oil Soluble | Results |
|---|---|---|---|---|
| | (American Cyanamid) succinamate | N—octadecylsulfo- | | on wall |
| 2.C | Monawet MB-45 (Mona Industries) | Diisobutyl sodium sulfosuccinate | No | Solid polymer, clear liquid |
| 2.D | Polystep B-23 (Stepan Chemical Co.) | Sodium alkyl ether sulfate | No | Solid polymer, clear liquid |

EXAMPLE 3

Cationic Emulsifiers

Into an 8 oz. polymerization bottle were charged: 546 weight parts of mineral spirits (Isopar M, Exxon), 99 weight parts of acrylic acid, 1 weight parts of trimethylol doallyl ether (TMPDAE), 0.2 weight parts of aozobisisobutylronitrle (Vazo 64, AIBN) and 20 weight parts of the cationic emulsifiers shown below. The polymerization was conducted as in Example 1 (above).

| Exp # | Emulsifier | Chemical Description | Oil Soluble | Results |
|---|---|---|---|---|
| 3.1 | Emcol ® CC-57 (Witco Chemical Corp.) | Polypropoxy quarternary ammonium phosphate | Yes | Very fluid |
| 3.2 | Monazoline C (Mona Industries) | Substituted imidazoline of coconut fatty acids | Yes | Nice fluid slurry |
| 3.3 | Emcol ® R CC-9 (Witco Chemical Corp.) | Polypropoxy quarternary ammonium chloride compound | Yes | Fluid |
| 3.4 | Monazoline CY (Mona Industries) | Substituted imidazoline caprylic acid | No | Gellatenous mass |

EXAMPLE 4

Amphoteric Emulsifiers

Into an 8 oz. polymerizations bottle were charged: 546 weight parts of mineral spirits (Isopar M, Exxon), 99 weight parts of acrylic acid, 1 weight parts of trimethylol diallyl ether (TMPDAE), 0.2 weight parts of azobisisobutyronitrile (Vazo 64, AIBN) and 20 weight parts of the amphoteric emulsifiers shown below. The polymerization was conducted as in Example (above).

| Exp # | Emulsifier | Chemical Description | Oil Soluble | Results |
|---|---|---|---|---|
| 4.1 | Deriphat 160 | Imadazoline derivative | Yes | Fluid Slurry |
| 4.2 | Deriphat 154 | Imadazoline derivative | Yes | Fluid Slurry |
| 4.A | Ampho B-11-34 (Capital City Products Company) | Complex coco betaine | No | Polymer on walls |
| 4.B | Cycloteric Bet-C 30 (Cyclo Chemicals Corp.) | Oleamidopropyl betaine | No | Large ball |
| 4.C | Monateric CA-35 (Mona Industries) | Coconut amphoteric | No | Gel-like mass |

EXAMPLE 5

Reactor Run—High Solids

Into a two liter reaction kettle equipped with heating jacket, paddle stirrer, thermometer and nitrogen puge line were charged: 45 weight parts of mineral spirits (Isopar M, Exxon), 10 weight parts of acrylic acid, 0.5 weight parts of trimethylolpropane diallyl ether and 2.0 Witconate ™ P10-59 (an amine salt of dodecyl benzene sulfonic acid anionic emulsifier produced by Witco Chemical Corp.). The reactor was heated to 70 C. under a nitrogen purge with stirring and 0.2 weight parts of azobisisobutyronitrile (Vazo 64) added. After polymerization was evident by the formation of fine white polymer particles, a feed stream of 88 weight parts of acrylic acid, 1.5 weight parts TMPDAE and 8.0 weight parts Witconate P10-59 was added over a period of three hours. After maintaining the temperature at 70 C. for an additional hour, a slurry of fine polymer in mineral spirits was recovered. Reaction slurry was 50% polymer. The slurry was very fluid and drained easily out of the reactor. There was little polymer build-up in the reactor.

Aqueous solutions were prepared directly from the slurry as in Example 1.

| Polymer concentration | 1% | 0.5% |
|---|---|---|
| Aqueous Viscosity (cps) | 50000 | 28500 |

If the above experiment were done without emulsifier, the result would be a total solidification of the reactor.

EXAMPLE 6

Large Reactor Polymerization

Into a stainless steel 10 gallon reactor were charged: 45.7 lbs of mineral spirits (isopar M, Exxon), 1.96 lbs of acrylic acid, 0.098 lbs of trimethylolpropane diallyl ether (TMPDAE), 0.392 lbs of Atlas G-3300 (an alkyl aryl sulfonate anionic emulsifier produced by ICI Americas Inc.) and 0.0372 lbs of azoisobutyronitrile (Vazo 64). The reactor was equiped with twin turbin blades for agitation, a nitrogen gas purging system and water jacketed for heating/cooling with a suitable controlling system for the maintenance of temperature. After heating the reactor to 70 C. with agitation, the reactor was sequentially evacuated and pressurized started nearly immediately and was evident by the requirement to cool the reactor to maintain temperature.

After polymerization was started, a feed stream of 17.6 lbs of acrylic acid, 0.294 lbs of TMDAE and 0.098 lbs of Atlas G-3300 was added over a period of 3 hours. The reactor was cooled after one additional hour of heating and the slurry drained from the reactor. The slurry was 28.8% polymer. The slurry was very fluid and drained easily out of the reactor. There was little polymer build-up in the reactor.

Aqueous solution viscosity was measured in the same manner as Example 1, directly from the slurry.

| Polymer Concentration (%) | 1% | 0.5% |
|---|---|---|
| Viscosity (cps) | 57200 | 33950 |

The foregoing embodiments of the present invention have been presented for purposes of illustration and description. These description and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

The claimed invention is:

1. A method for polymerizing olefinically unsaturated carboxylic acid monomers containing at least one activated carbon to carbon olefinic double bond and at least one carboxyl group, wherein the monomers are polymerized in an organic media consisting essentially of organic liquids, in the presence of free radical forming catalysts and at least one oil soluble ionic surface active agent selected from the group consisting of:

(a) anionic surface active agents of the formula:

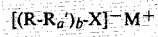

(b) cationic surface active agents of the formula:

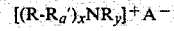

and (c) amphoteric surface active agents of the formula:

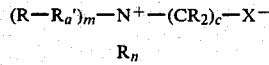

wherein

R is a hydrophobic moiety having eight or more carbons,

R' is a hydrophilic moiety,

R" is each independently hydrogen, an alkyl group, an aryl group or an alkyl/aryl group, $X^-$ is a carbonate, sulfonate, sulfate or phosphate group, $M^+$ is a water soluble cation, $A^-$ is a water soluble anion, a is 0, 1, 2, 3, 4, 5, 6, 7 or 8, b is 0, 1, 2 or 3, c is 1, 2, 3, 4, 5, 6, 7 or 8 x and y are each 0, 1, 2, 3 or 4 with the proviso that x+y=4, and m and n are each 0, 1, 2 or 3 with the proviso that m+n=3.

2. A method of claim 1 wherein R is a $C_1$ to $C_8$ alkyl group, aryl group, alkyl/aryl group, or a halogenated or substituted alkyl, aryl or alkyl/aryl group.

3. A method of claim 1 where R' is a hydrophilic moiety selected from the group consisting of polyoxyethylenes, polyoxyethylene alcohols, polyoxyethylene esters, polyoxyethylene alkylamines, amides, and polyols.

4. The process of claim 3 where R' is an amide selected from the group consisting of acrylamide, methacrylamide, polyacrylamide and polymethacrylamide.

5. The method of claim 3 where R' is a polyol selected from the group consisting of glycerol, sorbitol, polyglycerol, and polysorbitol.

6. The method of claim 1 wherein $M^+$ is $H^+$ or a metal or ammonium cation.

7. The method of claim 6 where $M^+$ is selected from the group consisting of $H^+$, $Na^+$, $A^+$, $K^+$, $Li^+$, $Mg^{+2}$, $Ca^{+2}$, $Sr^{+2}$, $Ba^{+2}$, $Fe^{+3}$, $Al^{+3}$, $NH_4^+$, monoethanolammonium, di-ethanolammonium and tri-ethanolammonium.

8. The method of claim 1 where $A^-$ is selected from the group consisting of $OH^-$, $F^-$, $Cl^-$, $Br^-$, $I^-$, $NO_3^-$, $SO_4^{-2}$, $SO_3^{-2}$ and $PO_4^{-3}$.

9. The method of claim 1 wherein the oil soluble ionic surface active agent is anionic surface active agent selected from the group consisting of carboxylates, polyalkoxycarbonates, protein hydrolysates, sulfonates, alkylbenzenesulfonates, alkylarylsulfonates, lignosulfonates, naphthalenesulfonates, α-olefinsulfonates, dialkyl sulfosuccinates, amidosulfonates, sulfoethyl esters of fatty acids, sulfates, ethoxylated and sulfated alcohols, ethoxylated and sulfated alkylphenols, sulfated acids, sulfated esters, sulfated oils and fats and phosphate esters.

10. The method of claim 11 wherein the alkylbenzenefulfonate is an amine salt of dodecylbenzene sulfonic acid.

11. The method of claim 1 wherein the oil soluble surface active agent is a cationic surface active agent selected from the group consisting of aliphatic monoamines, diamines, polyamines derived from fatty and rosin acids; amine oxides; ethoxylated alkylamines; 1-(2-hydroxyethyl)-2-imidazolines; alkoxylates of ethylenediamine; tall oil fatty acid diethylenediamine and polyalkylene polyamine condensates; and quarternary ammonium salts and alkylpyridinium halides.

12. The method of claim 1 wherein the oil soluble surface active agent is an amphoteric surface active agent selected from the group consisting of imidazolinium derivatives, alkylbetaines and amidoalkylbetaines.

13. The method of claim 1 wherein the oil soluble ionic surface active agent is present in amounts between 0.001 weight percent and 40.0 weight percent based on the weight of the monomers to be polymerized.

14. The method of claim 1 wherein up to 40 wt% of the monomers are present at the start of polymerization and the remainder of the monomers are continuously added during the course of polymerization.

15. The method of claim 1 wherein the carboxylic acid monomer is polymerized with up to and including 30 weight percent of at least one other vinylidene monomer containing at least one terminal $CH_2=C<$ group.

16. The method of claim 15 wherein the carboxylic acid monomer is present in an amount greater than or equal to 70 weight and there is present up to 5 weight percent of a polyfunctional crosslinking vinylidene monomer containing at least two terminal $CH_2=C<$ groups.

17. The method of claim 16 wherein the crosslinking monomer is selected from the group consisting of allyl pentaerylthritol, trimethylolpropane diallylether, and allyl sucrose.

18. The method of claim 15 wherein the carboxylic acid monomer is selected from the group consisting of acrylic acid, methacrylic acid and maleic acid.

19. The method of claim 15 wherein the vinylidene monomer containing at least one $CH_2=C<$ group is selected from the group consisting of acrylic esters.

20. The method of claim 1 wherein the organic media is selected from the group consisting of benzene, xylene tetralin, hexane, heptane, cyclohexane, mineral spirits, mineral oils, carbon tetrachloride, chloroform, trichloroethylene, methyl chloride, ethyl chloride, methylene chloride, chlorofluoromethane, chlorofluoroethane, methyl acetate, ethyl acetate, butyl propionate, methylethylketone, acetone and dioxane.

* * * * *